United States Patent [19]

Jezl et al.

[11] 3,965,083

[45] June 22, 1976

[54] PROCESS FOR THE VAPOR PHASE POLYMERIZATION OF MONOMERS IN A HORIZONTAL, QUENCH-COOLED, STIRRED-BED REACTOR USING ESSENTIALLY TOTAL OFF-GAS RECYCLE AND MELT FINISHING

[75] Inventors: James L. Jezl, St. Charles; Edwin F. Peters, Winfield; Robert D. Hall, Wheaton; John W. Shepard, Naperville, all of Ill.

[73] Assignee: Standard Oil Company, Chicago, Ill.

[22] Filed: Dec. 16, 1974

[21] Appl. No.: 533,018

[52] U.S. Cl. .................................. 526/65; 526/66; 526/67; 526/70; 526/71; 526/82; 526/132; 526/154; 526/344; 526/346; 526/348; 526/351; 526/352

[51] Int. Cl.² .................. C08F 2/34; C08F 2/36; C08F 6/02; C08F 10/00

[58] Field of Search ............ 260/94.9 P, 95 C, 93.7, 260/92.8 R, 94.3, 93.5 R

[56] References Cited
UNITED STATES PATENTS

| | | | |
|---|---|---|---|
| 2,292,897 | 8/1942 | Nielsen | 259/4 |
| 2,502,953 | 4/1950 | Jahnig | 196/52 |
| 2,797,908 | 7/1957 | Zubrzycki | 263/21 |
| 2,936,303 | 5/1960 | Goins | 260/94.9 P |
| 3,023,203 | 2/1962 | Dye | 260/94.9 P |
| 3,049,527 | 8/1962 | Powelson | 260/94.9 P |
| 3,078,261 | 2/1963 | Wisseroth et al. | 260/92.8 R |
| 3,245,762 | 4/1966 | Ullrich et al. | 23/285 |
| 3,254,070 | 5/1966 | Roelen | 260/94.9 |
| 3,256,263 | 6/1966 | Wisseroth et al. | 260/94.9 |
| 3,300,457 | 1/1967 | Schmid et al. | 260/88.2 |
| 3,338,986 | 8/1967 | Leibson et al. | 260/94.9 P |
| 3,368,875 | 2/1968 | Tulleners | 23/288 |
| 3,469,948 | 9/1969 | Anderson et al. | 260/94.9 P |
| 3,514,501 | 5/1970 | Leibson et al. | 260/878 |
| 3,522,227 | 7/1970 | Thomas | 260/92.8 R |
| 3,625,932 | 12/1971 | Green | 260/92.8 R |
| 3,652,527 | 3/1972 | Trieschmann et al. | 260/94.9 P |
| 3,770,714 | 11/1973 | Dorschner et al. | 260/94.9 P |

FOREIGN PATENTS OR APPLICATIONS 1,354,020    5/1974   United Kingdom

*Primary Examiner*—Alan Holler
*Attorney, Agent, or Firm*—Reed F. Riley; Arthur G. Gilkes; William T. McClain

[57] ABSTRACT

A method is herein disclosed by which a polymerizable monomer or a mixture thereof can be economically and efficiently converted to polymeric substances with a high yield catalyst in a vapor phase polymerization process using a stirred-bed, quench-cooled, horizontal reactor together with essentially total reactor off-gas recycle and melt finishing. The method is further characterized by being essentially isobaric at least up to the polymer finishing steps.

27 Claims, 3 Drawing Figures

PROCESS FOR THE VAPOR PHASE POLYMERIZATION OF MONOMERS IN A HORIZONTAL, QUENCH-COOLED, STIRRED-BED REACTOR USING ESSENTIALLY TOTAL OFF-GAS RECYCLE AND MELT FINISHING

SUMMARY OF THE INVENTION

This invention relates to a novel process for the vapor state polymerization of a polymerizable monomer or a mixture thereof to produce normally solid polymeric substances and, more specifically, to an essentially isobaric process for the polymerization of said monomer or mixture from the vapor state with a high yield catalyst, and, optionally, cocatalyst in a horizontal, quench-cooled, stirred-bed reactor which uses melt finishing and essentially total reactor off-gas recycle.

In accordance with the instant invention a monomer or mixture thereof is polymerized in an essentially isobaric vapor state process to normally solid polymers at pressures above atmospheric and at moderate temperatures in a horizontal, quench-cooled, stirred-bed reactor containing a subfluidized polymer bed. The process is further characterized by the essentially total recycle of reactor off-gases and by the use of an amount of easily vaporizable liquid which is controllably introduced along the length of the reactor for the purposes of controlling the temperature and removing the heat of polymerization. Additionally, the process is characterized by overflow removal of the solid polymer from the reactor into a post-polymerization zone where additional monomer is introduced and essentially adiabatic polymerization is allowed to take place, the heat of which serves to melt or help melt the polymer, which molten polymer is further heated by externally introduced heat and treated in the molten state with a catalyst decomposing substance. Such additives as are required to provide for commercial utilization of the polymer may be added and the product devolatilized and cooled to form solid polymeric product in a form which is appropriate for commercial use.

BACKGROUND OF THE INVENTION

One of the problems in solution or slurry polymerization of monomers is the capital costs required in the production thereof. Monomer polymerization using a vapor phase process can be considerably more economical if certain problems inherent in vapor state polymerization can be solved. These include problems of carrying out the polymerization in a thermally controlled fashion so as to avoid hot spots, maintaining a proper product particle size distribution and, in the case where catalysts are utilized which give extremely high yields but are extremely sensitive to poisoning, decreasing to a minimum the amount of make-up material seen by the catalyst per amount of product formed. Another problem, related to certain catalyst combinations is the narrow molecular weight distribution of the products formed with these catalysts. Now we have discovered a vapor phase polymerization process which largely or completely solves the above referred to problems and realizes important economic benefits through savings in energy consumption, raw materials and capital equipment.

In U.S. Pat. No. 2,502,953 (Jahnig) a weired, downwardly oriented apparatus for contacting fluidized solid particles with gaseous fluids to purge or strip volatiles from such solids is taught.

In U.S. Pat. No. 2,936,303 (Goins) a vapor state polymerization of ethylene, propylene or mixtures thereof is carried out in a countercurrent, fluidized bed in the presence of inert diluent gas. In the process described therein catalyst in solid form is passed downwardly in the vertical reactor and, for example, ethylene mixed with diluent gas is passed countercurrently up through a series of vertical fluidized bed reaction zones. In this process the reaction in the various reaction zones can be controlled independently by taking off-gas from the last reaction zone, cooling it, and recycling portions of such off-gas to each of the reaction zones. However, because of the use of diluent gas and a fluidized bed large quantities of gas must be passed through the reactor per unit of polymer produced.

In U.S. Pat. No. 3,023,203 (Dye) a suspended, gas phase polymerization of olefins using a reactor having three concentric superimposed vertical sections, comminuted catalyst addition suspended in the entering gases and temperature regulation by gas cooling is shown. The process includes polymer removal without pressure letdown.

In U.S. Pat. No. 3,254,070 (Roelen) a method for the gas phase polymerization of ethylene using conventional cooling is described wherein a mixture of reaction products and solid or liquid catalysts is constantly being mechanically subdivided. This patent additionally teaches that the reacting material may be agitatingly moved through a number of stages each with different polymerization conditions. An additional mode described therein teaches that the first few stages may be carried out using liquid phase polymerization finishing up with polymerization in the vapor phase. Different polymerization temperatures may be used in the separate reactors.

In U.S. Pat. No. 3,256,263 (Wisseroth et al.) a method of removing heat and producing intensive movement of the polymeric product produced during the gas phase polymerization of olefins in a stirred, vertical, fluidized bed reactor is described which uses mechanical agitation and introduction of the polymerization monomer immediately after expansive cooling in the form of moving gas or liquid jets.

In U.S. Pat. No. 3,300,457 (Schmid et al.) polymerization of monoolefins, particularly ethylene and propylene, is accomplished in a fluidized bed using a stirred, vertical reactor. Catalysts and polymer in the reactor are moved in the direction of flow of the monoolefin by the stirring and heat is removed by cooling the walls of the vessel, by conduction using the gas stream, or by the introduction of liquified monoolefin.

In U.S. Pat. No. 3,469,948 (Anderson et al.) a horizontal, paddle-type polymerization reactor using pulsed purge gases including the polymerizable olefin is described. The teaching of this patent is directed to the use of longitudinally oriented paddles which are suitably shaped to give forward movement to the solid polymer resulting from the vapor phase polymerization.

In U.S. Pat. No. 3,652,527 (Trieschmann et al.) a process for the gas phase polymerization of propylene in a stirred-bed, vertical reactor using evaporative cooling of the reaction is described. This patent teaches that it is essential that one component of the catalyst combination must be directly placed on the bed of solid polymer produced in the polymerization and the second catalyst component must be introduced in the gas phase above the bed.

Finally, in British Pat. No. 1,354,020 (Badische) a vapor phase olefin polymerization process is described in which the heat generated in the polymerization process is removed by the introduction of the monomer and heat transfer agents in gaseous or liquid state in the polymerization zone. However, the use of multiple polymerization temperatures in the vertical, stirred, fluid-bed reactor is not taught and it is difficult to see how such individual control could be accomplished with the apparatus described.

SHORT DESCRIPTION OF THE DRAWING

STATEMENT OF THE INVENTION

Figure 1:
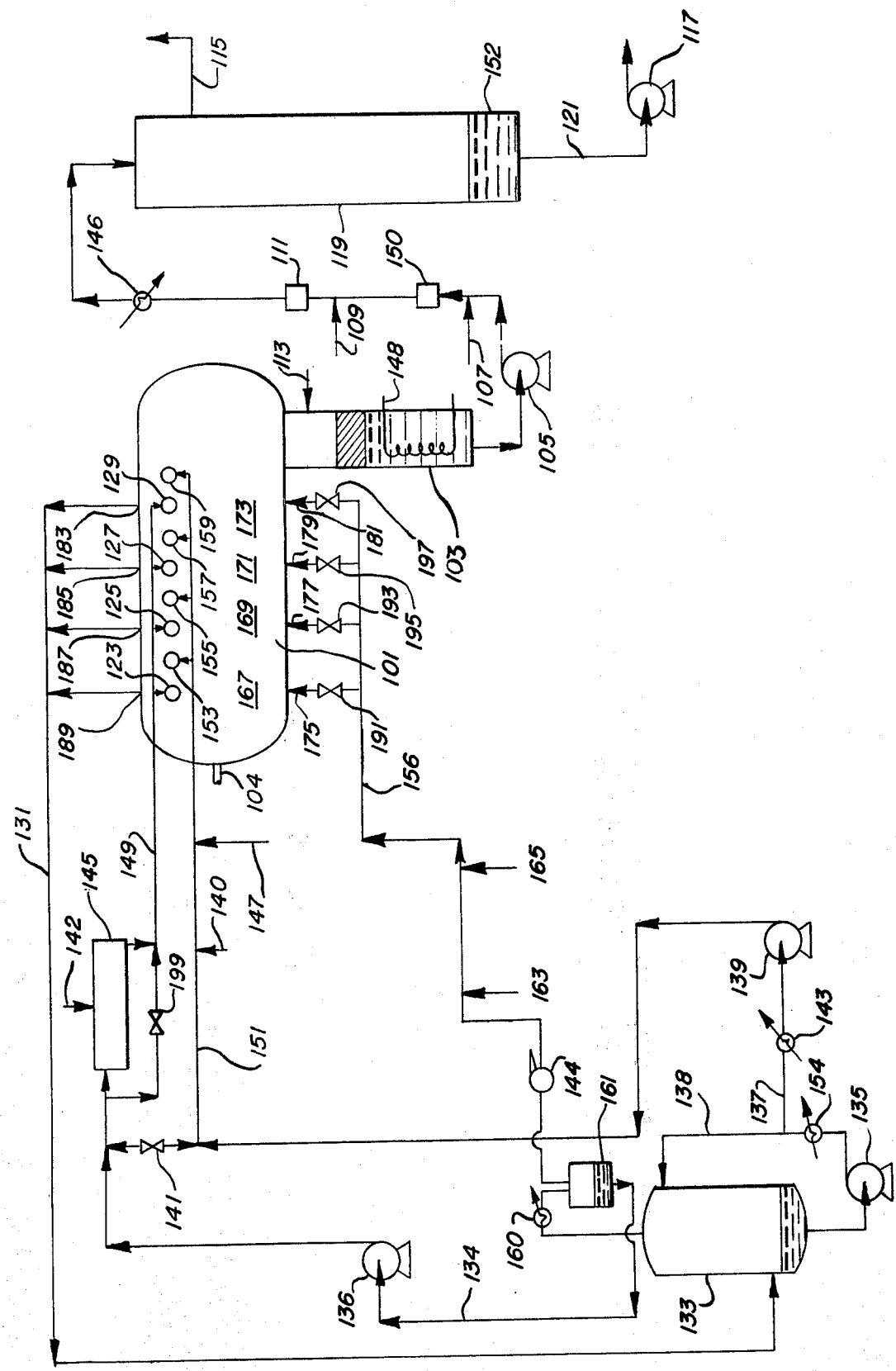
FIG. 1 shows one embodiment of the process described herein for the polymerization of monomers.

The invention described herein is a process for the essentially isobaric, vapor phase polymerization of polymerizable monomers utilizing essentially total reactor off-gas recycle, a quench-cooled, stirred-bed horizontal reactor and a polymer melt finish step. It is particularly adapted for use with polymerization catalysts which have a high enough polymerization yield that catalyst residues need not be removed from the polymeric product during the polymer finishing process. In general, the process involves a controlled introduction of catalyst components and quench liquid into the one or more polymerization sections of the reactor directly into and onto the stirred, subfluidized bed of forming polymer and polymerization of monomer or mixtures thereof from the vapors in and over such bed. The polymer is continuously removed by passing into a take-off vessel generally placed at one end of the reactor, which vessel contains a post-polymerization zone wherein a controllable amount of essentially adiabatic polymerization takes place producing heat which together with externally added heat melts the polymer to form easily transferable liquid polymer. The melted polymer is thereafter treated with a kill substance such as water to decompose catalyst and cocatalyst, if used, additives suitable for various commercial uses may be added, and the molten polymer devolatilized and converted to the appropriate commercial size product, generally pellets. The reactor introduces monomer or mixtures thereof and, optionally, hydrogen largely or wholly underneath the subfluidized polymer bed and quench liquid onto the surface of the bed. The reactor may have one or more polymerization sections and the several sections are separated from each other by weirs or other suitably shaped baffles. Each polymerization section is individually controlled in terms of polymerization temperature and/or polymer production rate so that a polymeric product having a controlled spread of molecular weight and particle size distribution may more easily be produced.

Reactor off-gases are removed from the top of the reactor after removing polymer fines more or less completely from the off-gases. The reactor off-gases are then taken to a separation zone whereby the quench liquid is at least in part separated along with any further polymer fines and some of the catalyst components from polymerization monomer and hydrogen, if used, which monomer and hydrogen are then recycled to inlets spaced along the various polymerization sections of the reactor generally underneath the polymer bed. A portion of the quench liquid is taken off the separation zone and in major parts returned with further entrained polymer fines to inlets spaced along the top of the reactor and in minor part, essentially freed of polymer fines and catalyst components, fed into a catalyst make-up zone so that fresh quench liquid need not be introduced for diluent purposes. Provision may be made in a multiple section reactor to introduce the vapor recycle, catalyst components and quench liquid at different rates into the different sections of the reactor to aid in individual control of the polymerization temperatures and polymer production rates of the sections. The concentration of catalyst components being introduced into the various sections may be varied in order to change and help control polymer molecular weight, molecular weight distribution and particle size distribution. Catalyst components may be added into or onto the stirred bed.

By the term vapor state reactor or process is meant a reactor or process, the monomer or monomers of which are vapors or gases under the conditions prevailing in the reactor.

One embodiment of the process is shown in detail in FIG. 1 which process may be divided roughly into three areas, the reactor area, the reactor off-gas treatment (separation) and catalyst make-up area, and the polymer take-off and melt finishing area.

As may be seen by the embodiment shown in FIG. 1 the reactor volume of horizontal polymerization reactor 101 is divided into several, stirringly-agitated sections 167, 169, 171 and 173 to provide for the possibility of operating the different sections of reactor at different temperatures and polymer production rates. Polymerization takes place in each of the aforementioned sections to form a polymer bed distributed throughout the reactor and the polymerization temperature of each of the sections can be individually controlled by a combination of methods including the stirring agitation, the controlled different introduction of vapor recycle into each of the sections through inlets 175, 177, 179 and 181 along the bottom of the reactor, and the introduction into each of the sections of inert quench liquid and catalyst components at different rates through quench liquid inlets 153, 155, 157 and 159 and catalyst inlets 123, 127 and 129 spaced along the top of the reactor.

Reactor off-gases are removed through outlets 183, 185, 187 and 189. Since a certain deleterious amount of polymer fines may be produced in the reactor they are advantageously substantially removed prior to transfer of the reactor off-gases to the reactor off-gas treatment and catalyst make-up area by using traps, filters, settlers, cyclones or scrubbers or a combination thereof.

Polymer is produced then in each of the stirringly agitated polymerization sections 167 through 173 and due to the continued production of such polymer, an amount of reactor product constantly passes through the take-off barrier out of the reactor into polymer take-off vessel 103.

Catalyst, dissolved or slurried in recycle quench liquid, is advantageously introduced onto the bed in at least one of the various reactor sections through inlets 123, 125, 127, and 129. Similarly placed inlets 153, 155, 157, and 159 are used to introduce the recycle quench liquid, which may contain cocatalyst make-up from line 147, onto the bed into the individual reactor sections. However, depending upon the nature of the catalyst, cocatalyst and monomer to be polymerized, catalyst and/or cocatalyst can be sprayed or otherwise introduced into the reactor neat or in other non-polymerizable vehicles. Alternatively, for some monomers, catalyst and cocatalyst can be added into catalyst make-up zone 145 and added to reactor 101 together.

In one mode of operation it has been found advantageous to make the catalyst and quench liquid inlets concentric so that the catalyst and quench liquid are sprayed into the reactor and onto the surface of the polymer bed in such a way as to more evenly distribute catalyst on the polymer bed surface. However, the catalyst and quench inlets may be made separate and the catalyst and quench liquid introduced separately onto the bed.

The reactor off-gases are taken via line 131 to scrubber tower 133 wherein at least part of the quench liquid component of the off-gases, further polymer fines and some of the catalyst components are removed from the polymerizable monomer and hydrogen, if used. The polymerizable monomer and hydrogen, containing some vaporized quench liquid, and cocatalyst vapors are returned to reactor 101 from the top of tower 133 after, advantageously, being cooled by heat exchanger 160 and passing through separator 161 to condense out additional quench liquid, via blower 144 and vapor recycle line 156. Alternatively, monomer and hydrogen can be returned through scrubber tower 133 to reactor 101 by-passing heat exchanger 160 and separator 161. Additional hydrogen and monomer make-up may be added via lines 163 and 165. The quench liquid of separator 161 is essentially free to polymer fines and catalyst components and suitable for use in catalyst make-up zone 145.

Vapor recycle containing monomer or monomers, hydrogen, if used, and quench liquid vapor is brought through vapor recycle line 156 to recycle inlets 175 to 181 at a rate designed to prevent fluidization of the bed. The amount of vapor recycle introduced into the individual sections of the reactor via inlets 175, 177, 179, and 181 can be individually controlled by valves 191, 193, 195, and 197.

Quench liquid, separated from the reactor off-gases, is cooled by heat exchanger 154 and returned by pump 135 in major portion to the top of scrubber tower 133. A minor portion of the quench liquid is returned through line 137, heat exchanger 143, pump 139 and quench liquid recycle line 151 to quench liquid inlets 153, 155, 157, and 159 carrying with it some monomer, hydrogen and the polymer fines carried by the off-gases into scrubber tower 133. In the important embodiment in which cocatalyst is used, make-up cocatalyst can be injected directly into the recycle quench liquid stream through line 147 or added neat or otherwise diluted into reactor 101. A small portion of separated quench liquid essentially free of polymer fines and cocatalyst is taken off separator 161 via line 134 and pumped through pump 136 to catalyst make-up zone 145 for catalyst dilution. Make-up quench liquid may be added through line 140.

The recycle system which includes catalyst make-up zone 145, reactor 101 and melter 103 are operated essentially isobarically. That is, no more than the normal pressure changes expected from and operations described herein are present, preferably ±25 psig and, more preferably ±10 psig.

Polymerization in catalyst make-up zone 145 or associated line 149 and inlets 123–129 can cause serious plugging problems and may be controlled in an embodiment using cocatalyst by keeping the cocatalyst concentration in catalyst make-up zone 145 below a certain value, which value depends upon the identity of the catalyst and cocatalyst used and the monomer to be polymerized. In a case where cocatalyst is introduced through catalyst make-up zone 145, polymerization, if a problem, can be reduced by the temperature lowering of, shortening the residence time in, etc., make-up zone 145. Alternatively, make-up quench liquid from line 147 can be used in catalyst make-up zone 145 in place of recycle solvent to prevent polymerization of monomer in such zone.

Valve 199 has been provided in the catalyst make-up zone bypass line in order to more easily vary the concentration of catalyst in the catalyst make-up introduced into the reactor. It has been found that particle size of the polymer produced in reactor 101 can be advantageously varied by varying the concentration of the catalyst being introduced through inlets 123, 125, 127 and 129. Further, it has been found advantageous to vary the catalyst concentration either by changing its concentration in make-up zone 145 or, additionally and alternatively, to change its concentration by introducing quench liquid into catalyst line 149 via valve 199 just prior to the point where the catalyst enters the catalyst inlets 123, 125, 127, and 129. Make-up catalyst is added to make-up zone 145 through line 142.

In the important embodiment of the process described herein in which the polymerization temperature of one or more of the sections is held at a different value than that in the other sections (dual temperature operation or multi-temperature operation), it is advantageous to vary the amount of any or all of the catalyst components being introduced into the various sections. Particle size distribution, molecular weight, and molecular weight distribution are advantageously affected thereby. This may be accomplished by feeding the catalyst inlets of the different sections individually. Even in single temperature operation, it can be advantageous to feed one or more of the sections with catalyst components in different amounts than catalyst components being introduced into the other section or sections.

The polymer which builds up in stirred reactor 101 traverses the length of reactor essentially because of polymer build-up in the reactor bed and not by the stirring agitation. This condition is insured by the paddle design used which provides for agitation but not for backward or forward movement of the bed. Polymer particles in the bed adjacent to the take-off barrier are swept by the stirring past the take-off barrier opening, which opening may be made variable in size by a number of devices for maintaining different levels of polymer solid in the bed.

Weirs, if used, may be attached to drive shaft 104 with slip rings or fixed to the wall of reactor 101 and are beneficially oriented so that the top of the weir is roughly aligned with the bed orientation during agitation. This provides for spill-over along the entire length of the weir top. However, the weirs can be oriented horizontally, if desired. Alternatively, baffles of other shapes may be used to fulfill the function of the weirs which is to prevent gross back-mixing of the polymer in the several polymerization sections. For example, thin wall barriers attached to the drive shaft 104 which fill the reactor cross-section and have one or more holes cut in them may be used, as can be understood by one skilled in the art.

The polymer particles passing through such take-off barrier opening fall into polymer take-off vessel 103 without substantial pressure letdown and the monomer addition line 113 in take-off vessel 103 is set to supply sufficient monomer to the top portion of take-off vessel 103 so that sufficient, essentially adiabatic polymerization takes place in take-off vessel 103 to help melt polymer. The heat of this adiabatic polymerization can be sufficient to melt the solid polymer and together with externally added heat added via through 148 serves to form an easily transferable molten layer of polymer below the solid layer in take-off vessel 103.

The rate at which polymer is taken through the take-off barrier opening and the rate at which polymer is melted in polymer take-off vessel 103 determines the relative sizes of the upper solid polymer layer and the lower molten polymer layer contained in polymer take-off vessel 103. The molten polymer is drawn off at the bottom of polymer take-off vessel 103 by means of melt pump 105 whereupon beneficially, a suitable catalyst component decomposing substance such as water is added thrugh line 107. The molten polymer after the addition of such decomposing substance is beneficially mixed via mixer 150 so that the decomposing substance thoroughly contacts the molten polymer. Optionally, and depending upon the final commercial use of the particular polymer formed in reactor 101, additives such as stabilizing substances and coloring substances may be added through line 109 followed by mixing zone 111 to blend such additives with the still molten polymer. Optionally, line 109 may be located after devolatilizer 119.

In a beneficially utilized variant both decomposing substance and additives can be introduced together slurried in an inert volatilizable vehicle such as hexane and the like. In such case the combination is admixed with the molten polymer prior to the devolatilization step.

Thereafter, the treated molten polymer is passed into devolatilizer 119 to remove by vacuum essentially all of the volatile components remaining in the molten polymer via line 115. Alternately, a purge line may be added to 119 to sweep volatiles out line 115 using steam, nitrogen or another inert material. A particularly beneficial type of devolatilization apparatus is one wherein the molten polymer is passed through an ejection nozzle of a stranding die whereafter the strands of polymer fall to the bottom of the devolatilizer as they lose the volatile components. Thereafter, devolatilized molten polymer 152 is drawn out line 121 by melt pump 117 whereafter the polymer is cooled and formed into commercial materials.

Figure 2:
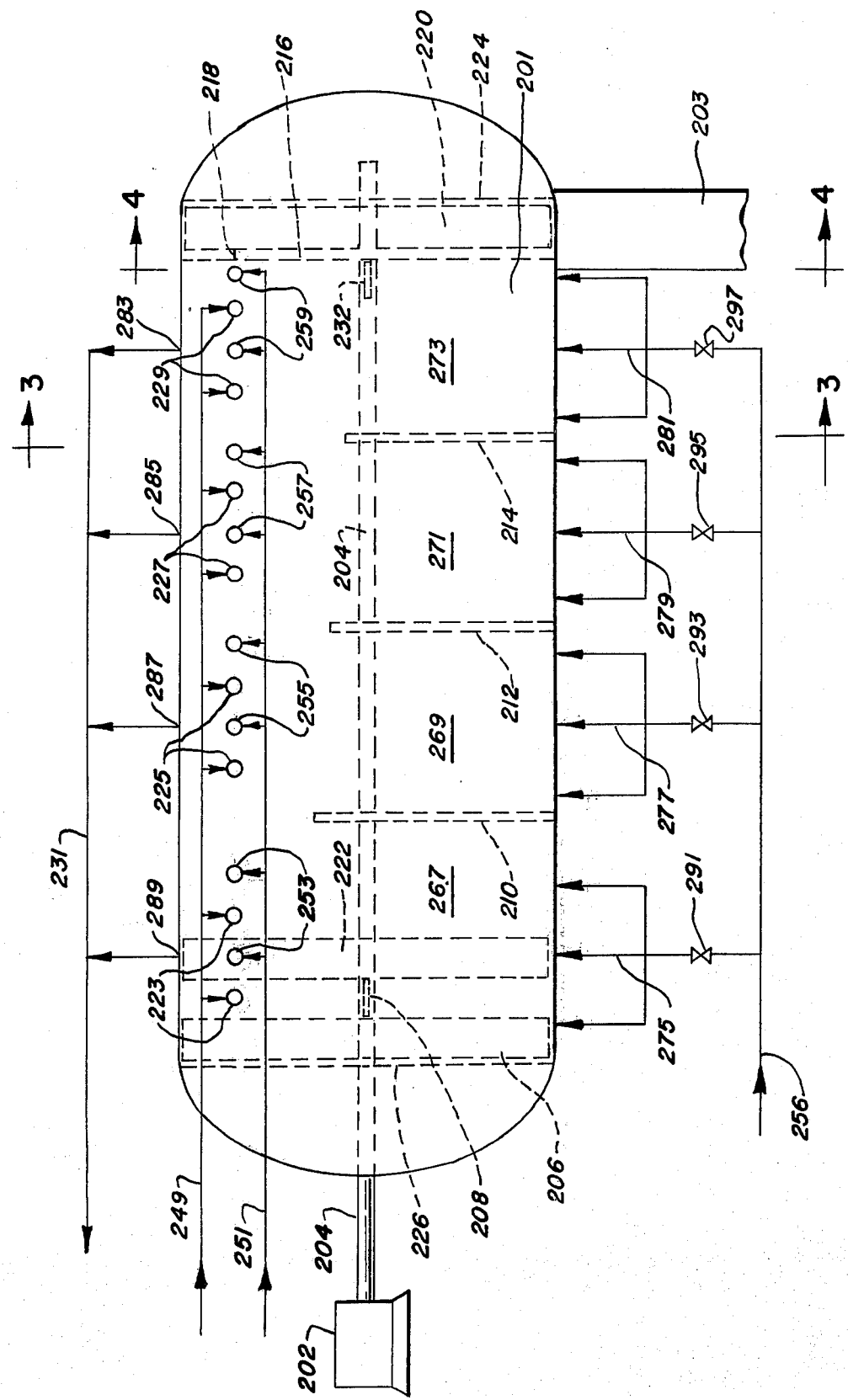
FIG. 2 shows a reactor design which is particularly suitable for the process shown in FIG. 1.

FIG. 2 shows in detail reactor 101 of FIG. 1. It may be seen that the interior of reactor 201 is composed of four individually controllable sections 267 to 273 separated from one another by weirs 210 to 214, which weirs extend upwardly to somewhat over the middle of the reactor and are oriented so that their surfaces line up approximately with the agitated polymeric bed surface. False end plates are placed at each end of reactor 201 for mechanical construction convenience and are shown as 224 and 226. In a favored embodiment weirs 210, 212 and 214 are constructed in height so that the polymer bed fills about half the volume of the reactor. As the powder exceeds the weir height it falls into the adjacent section in the direction of take-off vessel 203.

In a mode wherein it is desired to operate with two or more gas compositions (e.g., different hydrogen concentrations) as well, all the section barriers may be constructed as above except for the one or more dividing structures which divide the reactor into compartments of different vapor compositions. The dividing structures are thin wall barriers extending upwardly and filling the cross-section of the reactor and contain an opening situated beneath the level of the polymer bed for polymer solid movement so that intermixing of gses in adjacent compartments can be controlled. Operating in such a variable gas composition mode, the individual compartments should have separate reactor off-gas recycle treatments and returns and may have separate hydrogen and monomer make-ups.

Generally, the dividing structures are designed to prevent extensive intermixing of the vapor in the individual compartments, however, in one mode of multiple hydrogen operation the vapors are deliberately mixed by feeding the vapors from the hydrogen poor compartment to the hydrogen rich compartment and adding make-up monomer primarily to the hydrogen poor compartment and hydrogen make-up primarily to the hydrogen rich compartment.

The interior of the reactor is equipped with a rotating paddle drive shaft 204 extending longitudinally through reactor 201 to which are attached paddles extending transversely from the shaft and making close clearance with the inside wall of reactor 201 to insure adequate bed mixing at the reactor wall. The paddles are preferably flat to maximize bed agitation for a given rotational speed and preferably two paddles per impellor are used. The width of the paddles is such that between about four and about 12 impellors eight to 24 paddles) will be present in a reactor section of about 3 feet in length. The orientation of the paddles on adjacent impellors is about 90°. The paddles are so constructed to minimize any forward or backward movement of the bed during stirring and are driven by motor 202 at such a speed as to give a slow and regular turnover of the entire polymer bed contained in the reactor. The speed at which the impellors turn should be fast enough to provide the desired heat and mass transfer between liquid, solid and gas but not so fast that the finer portions of the polymer solid are thrown up in large quantities into the space above the bed. That is, the speed typically is about 5 to about 30 RPM so that the integrity of the bed is maintained.

The space after the take-off barrier and above the take-off vessel is likewise equipped with one or more similar impellors 220, the size and number of which depend upon the size of the take-off. However, other take-off assemblies such as end or side take-off apertures, which assemblies replace the take-off barrier, may be used as can be understood by one skilled in the art.

A plurality of catalyst and quench inlets may be used in reactor 201 and one or more of pairs of catalyst and quench inlets may be used for each reactor section, 267 to 273. The catalyst and quench inlets are typicaly designed so that the catalyst and quench liquid are distributed onto the top of the stirred bed at roughly the same location. Such introduction of catalyst and quench liquid combined with slow agitation has been found to provide more uniform polymerization and prevent localized polymer fusion in the polymer bed and hence reduce the number of molten plugs of polymer formed and give more troublefree performance of the reactor. It is advantageous in one mode of carrying out polymerization in the reactor to provide for separately controlled addition of catalyst components and quench liquid to the various sections by means of, for example, valves. Such separately controlled additions into reactor sections 267 to 273 help provide for separate control of polymerization temperatures and polymer production rates among the sections and can be used to vary and control the molecular weight, molecular weight distribution and particle size distribution of the polymer.

The vapor recycle which includes the polymerizable monomer or monomers and hydrogen, if used, is brought in through vapor recycle line 256 to vapor recycle inlets 275 to 281 at a rate suitable to maintain the bed in a subfluidized condition. The rate at which the vapor recycle gases are introduced into the invididual sections 267 to 273 can be controlled by valves 291 to 297 and such control may be used to help vary the section temperatures if desired.

The overall reactor temperature range for polymerization depends upon the particular monomer which is being polymerized and the commercial product desired therefrom and as such are well known to those skilled in this art. In general, the temperatures range used varies between about 40°C up to about the softening temperature of the bed. The total polymerization pressure is composed of the polymerizable monomer pressure, vaporized quench liquid pressure, and hydrogen pressure, if used, and such total pressure typically may vary from about atmosphere to about 600 psig. The individual partial pressures of the components making up the total pressure determine the rate at which polymerization occurs, the molecular weight and the molecular weight distribution of the polymer to be produced. The temperature of polymerization is controlled as may be understood by one skilled in the art.

Figure 3:
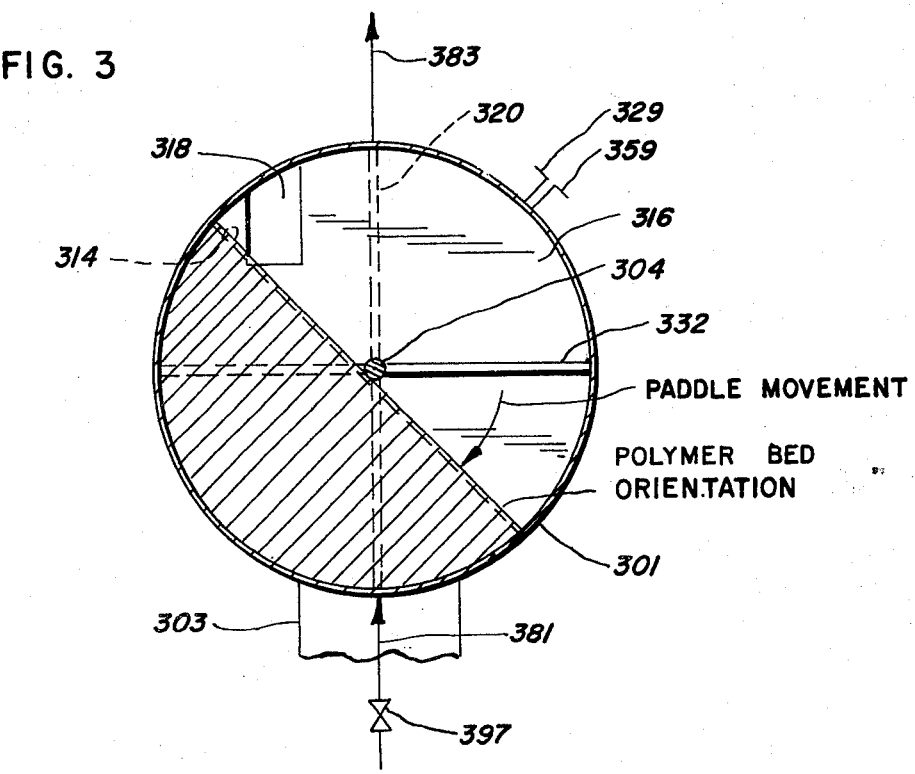
FIG. 3 is an additional view of the reactor of FIG. 2 along line 3—3.

In FIG. 3 a view of reactor 201 of FIG. 2 is shown along line 3—3 of FIG. 2. The Figure shows the 90° orientation of the paddles on adjacent impellors and the shape of adjustable take-off barrier opening 318 and the take-off barrier 316. Further, the Figure shows the orientation of weir 314 and the polymer bed and the direction of paddle movement with respect to the polymer bed orientation.

Figure 4:
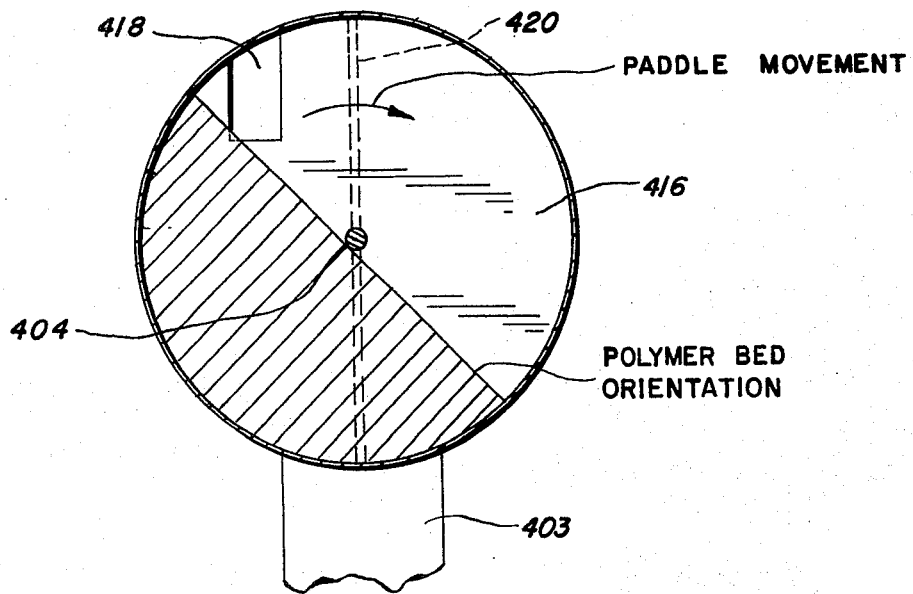
FIG. 4 shows an additional view of the reactor of FIG. 2 along line 4—4.

FIG. 4 shows a view of reactor 201 of FIG. 2 along line 4—4 of FIG. 2. Also shown are take-off barrier 416, its opening 41, take-off impellor 420 and the direction of motion of the paddles with respect to the orientation of the polymer bed.

The apparatus and process described herein may be applied to the polymerization of polymerizable monomers which are polymerizable below the softening point of their polymeric forms including ethene, propene, 4-methyl-pentene-1, butene-1, vinyl chloride, butadienes, styrene, poly(ethylene terephthalate) and mixtures of such monomers. Particularly suitable are the polymerization of ethene and propene.

The quench liquid used for temperature control is a readily volatilizable liquid which can be sprayed onto the surface of the polymer bed to evaporatively conduct heat away from the polymeric powder bed and thus should be inert to the monomer being polymerized, the catalyst components used in the polymerization, and have as high a heat of evaporation as is consistent with ready volatilization of the quench liquid in the reactor at polymerization temperatures. In general alkanes such as propane, a butane, a pentane, or a hexane or closely boiling mixtures thereof may be used. The preferred quench liquid for ethene is isobutane or isopentane. It should be understood that where the monomer to be polymerized is readily condensible, e.g., propene, the quench liquid can be the liquified monomer or mixture of liquified monomer and an additional quench liquid.

The rate of quench liquid addition should be low enough to keep the polymer bed dry, i.e. maintain the partial pressure of the quench liquid vapor below the dew point, yet large enough to obtain the maximum cooling effect of the quench liquid. Generally, the quench liquid will carry away 50 percent or more of the heat of polymerization. For propene polymerization over 90 percent of the heat of polymerization is desirably removed by the quench liquid. At a 200°F polymerization temperature in the polymerization of ethene, desirably more than 70 percent of the heat of polymerization is removed using isobutane and more than 50 percent of the heat is removed using isopentane.

In general, the catalysts which are most useful to the process described herein are those which are very active and give a high yield on catalyst. Included in this group are cocatalysts composed of organometallic compounds of Periodic Groups IA, IIA and IIIA and catalysts which are based on transition metal compounds. Aluminum alkyl compound cocatalysts are especially preferred and include trialkylaluminums and alkylaluminum halides such as a dialkyaluminum chloride. The transition metal catalyst can be a metal compound of Group IV or Group V such as a titanium or vanadium compound, a compound of Group VI such as chromium or molybdenum oxide or may be one of these catalysts supported on a magnesium-based support or a support such as alumina, silica or silica-alumina.

The preferred catalysts and cocatalysts are as aforesaid high yield catalysts. By high yield is meant catalysts and cocatalysts the residues of which do not have to be removed from the products of the process.

The preferred catalyst and cocatalysts for ethene polymerization are a trialkylaluminum cocatalyst with a catalyst which is a titanium compound supported on magnesium-based support or chromium oxide supported on alumina, silica or silica-alumina. For propene polymerization it is preferable to use a dialkylaluminum chloride cocatalyst and a catalyst which is an active titanium trichloride. However, the process and apparatus described herein are not meant to be limited to the catalyst components used except in that the process operates best for high yield catalysts.

While the invention is described in connection with the specific Examples below, it is to be understood that these are to be for illustrative purposes only. Many alternatives, modifications, and variations will be apparent to those skilled in the art in light of the below Examples and such alternatives, modifications and variations fall within the spirit and scope of the appended claims.

EXAMPLE I

A supported titanium chloride catalyst was suspended in isopentane at a concentration of 30 milligrams/liter and pumped continuously to the reactor at a rate of 300 milliliters/hour. Aluminum triethyl diluted with isopentane to 1000 milligrams/liter was pumped continuously at a rate to maintain the desired weight ratio of aluminum triethyl/catalyst between 3/1 to 15/1. Ethylene was charged continuously at the rate of polymerization to maintain pressure, 300 psig. A continuous stream of gas 0.3 cubic feet/hour was removed from the reactor for gas chromatographic analysis to maintain the hydrogen concentration in the reactor at 34 mol percent by intermittent hydrogen addition for polymer molecular weight control. The reactor polymer bed temperature was held at 160°F. by continuously spraying isopentane at the appropriate rate onto the 30 R.P.M. stirred polymer bed. The vaporized isopentane was condensed and recycled. The non-condensed gas (40° to 50°F.) was continuously recycled back into the bottom of the stirred polymer bed. The polymer bed level was maintained by the opening position in the retaining weir. The polymer overflow spilled out into the melter which was maintained at 350° to 400°F. by a combination of polymerization heat and external electrical heat. The melted polymer sumps to the bottom and is forced through a horizontal piece of ¾-inch diameter × 4 foot long pipe at 400° to 500°F. by the reactor pressure. Water was injected continuously into the polymer melt between the melter and catalyst deactivator at a rate of 10 milliliters/hour. Polymer melt extrudes from the catalyst deactivator through a ⅜-inch diameter opening and is drawn through a water bath and chopped. Polymer was produced at the rate of 1 to 3 pounds/hour, at a yield level of 100,000 grams polymer/gram of catalyst. Physical properties of the polymer taken out of the melter are shown below in Table I and some properties of the polymer powder taken from the reactor are shown in Table II.

TABLE I

Conditions: 160°F, 300 psig, 34 mole % $H_2$, 13/1 to 15/1 triethyl aluminum/catalyst weight ratio

| | Run A | Run B[1] |
|---|---|---|
| General Properties | | |
| Unannealed density, g/cc | 0.961 | 0.959 |
| Annealed density, g/cc | 0.977 | 0.977 |
| Inherent viscosity, dl/g | 1.87 | 2.29 |
| Melt index, $MF_1$, g/10 min | 0.92 | 0.44 |
| Melt index, $MF_{10}$, g/10 min | 38 | 24 |
| Flow rate ratio, $MF_{10}/MF_1$ | 41.4 | 54.5 |
| Hexane extractables, wt % | 0.47 | 0.41 |
| Oven volatiles content, wt % | 0.20 | 0.28 |
| Stiffness, psig | 165,000 | 160,000 |
| Molecular Weight Parameters, GPC | | |
| Molecular weight distribution, $M_w/M_n$ | 7.6 | 10.5 |
| Tensile Properties | | |
| Tensile strength at yield, psig at 2 in/min | 4540 | 4600 |
| Tensile strength at ultimate, psig at 2 in/min | 3410 | 2810 |

TABLE I-continued

Conditions: 160°F, 300 psig, 34 mole % $H_2$, 13/1 to 15/1 triethyl aluminum/catalyst weight ratio

| | Run A | Run B[1] |
|---|---|---|
| Elongation at yield, % at 2 in/min | 10 | 11 |
| Elong. at ultimate, % at 2 in/min | 200 | 689 |
| Impact Properties | | |
| Tensile impact strength, ft-lb/in² | 65 | 88 |
| Izod impact strength, ft-lb/in notch | 9.2 | 9.8 |
| Thermal Properties | | |
| Vicat softening point, °F | 266 | 262 |
| Brittleness temperature, °C | — | — |

[1] Triethylaluminium/catalyst weight ratio = 2.6/1 to 3.75/1.

TABLE II

Conditions: 160°F, 300 psig, 34 mole % $H_2$, 13/1 to 14/1 triethylaluminum/catalyst weight ratio

| | RUN A | | | RUN B |
|---|---|---|---|---|
| Cut number | 5R | 8R | 10R | 6R |
| Total polymer produced, gms | 3628 | 5509 | 6637 | 1952 |
| Inventory turnover (No. of times) | 3.0 | 4.6 | 5.5 | 1.6 |
| % original inventory remaining | 5 | 1 | 0.4 | 20 |
| Bulk density, g/cc | 0.36 | 0.37 | 0.37 | 0.41 |
| $MF_{10}$ | 28.7 | 38.7 | 48.2 | |
| $MF_1$ | 0.89 | 1.0 | 1.3 | |
| $MF_{10}/MF_1$ | 32.3 | 38.7 | 37.1 | |

EXAMPLE II

A carbon steel reactor approximately 2 feet in diameter by 3.0 feet in length was used in this continuous ethylene-propylene polymerization. Temperatures were 181°F at one end of the reactor, 171°F at the center of the reactor and 181°F near the take-off weir end and reactor total pressure was 400 psig. Ethylene was fed to the reactor at 20.57 pounds/hour and propylene was added at 0.29 pounds per hour. The recycle gas rate was 2.29 actual cubic feet per minute and the recycle quench liquid, isopentane, rate was 0.29 gallons/minute. The supported titanium catalyst was added at about 0.3 grams per hour as a dilute slurry in isopentane. The amount of slurry added was about 3 gallons per hour. Triethylaluminum cocatalyst was added as a solution in isopentane at a rate of 35 milliliters per hour at a concentration of 0.025 grams triethylaluminum per milliliter.

Gas analyses of reactor recycle gases were continuously made and typical values were: hydrogen, 37 mol percent; ethane, 0.3 mol percent; propene, 1.1 mol percent; isopentane, 1 mol percent and ethene, 60.6 mol percent.

The melt index of product was about 0.58 grams/10 minutes.

EXAMPLE III

Ethylene was polymerized in the same manner described in Example I. The catalyst was 2.0 weight percent chromium trioxide on W. R. Grace No. 952 $SiO_2$. Catalyst was calcined at 1200°F. with dry oxygen for 12 hours. Catalyst, triisobutylaluminum and ethylene were continuously charged to the reactor at 210°F. under 300 psig. pressure. Hydrogen was charged as needed to maintain 35 mol percent $H_2$ in the reactor. The mole ratio of $Al(i-Bu)_3/CrO_3$ was 3. The polymer yield based on catalyst was 4,600 grams/gram. Polymer was removed continuously as a melt. The polymer produced showed the following physical properties:

TABLE III

| Cut | M. I. | MF$_{10}$ | MF$_{10}$/MF$_1$ | Wt. Percent Extractables | Wt. Percent Volatiles | $\bar{M}n/\bar{M}n$ |
|---|---|---|---|---|---|---|
| 5 | 0.20 | 22.2 | 111 | 1.5 | 0.65 | 14.7 |
| 6 | 0.12 | 16.6 | 138 | 1.6 | 0.87 | 17.0 |
| 7 | 0.12 | 20.2 | 168 | 1.8 | 0.98 | 15.4 |

EXAMPLE IV

Propylene was polymerized in essentially the same manner described in Example I. The recycle gas and quench liquid were propylene. The melter temperature was 350°F. while the catalyst kill section operated at 400°F. An active titanium chloride catalyst (33 milligrams) with diethylaluminum chloride cocatalyst (77 milligrams), mol ratio Al/Ti = 3, was charged to the reactor every 30 minutes. Hydrogen was added as needed to maintain 2.9 mol percent in the reactor gas cap. The reactor temperature was maintained at 160°F. and the reactor pressure was controlled at 300 psig by controlling temperature in the condenser at about 120°F. A polymer yield based on catalyst of 10,000 grams/gram was obtained. The polymer was removed from the reactor as a melt. The polymer showed a melt flow rate of 16.4 grams/10 minutes at 230°C. under load of 2,060g. The 68°C. n-hexane extractables was 4.0 weight percent.

EXAMPLE V

Ethylene was polymerized in the same manner described in Example I except in this case two sections of the reactor were maintained at different temperatues. Reactor section one was operated at 160°F. while reactor section two was operated at 210° to 230°F. This was accomplished by varying the amount of isopentane quench added to each section. The catalyst used was a supported titanium compound and an aluminum triethyl cocatalyst was added in a weight ratio of cocatalyst to catalyst of 3 to 1. The reactor pressure was controlled at 300 psig. and the hydrogen concentration was maintained at 40 mol percent. A polymer yield of 62,000 grams of polymer/gram of catalyst was obtained. The polymer melt index was measured at 5.5 with a MF$_{10}$/MF$_1$ of about 40 and a spiral flow of 18 inches. Polymer made under single temperature conditions having the same M.I. showed an MF$_{10}$/MF$_1$ value of about 34 and demonstrated a spiral flow of about 16 inches. Spiral flow is an empirical method of assessing ease of processability of a polymer by measuring the length of flow in a special mold under specific temperature and pressure conditions. The longer the spiral flow is the easier the processability.

What is claimed is:

1. A process for continuously polymerizing from the vapor state at least one polymerizable monomer comprising:
   a. introducing said monomer into one or more vapor recycle inlets which are spaced along, and a majority of which are located below, a sub-fluidized bed of polymer distributed within a stirred, horizontal reactor operating at polymerization conditions, said reactor containing one or more individually polymerization-temperature-controllable polymerizable sections;
   b. introducing at least one catalyst component into one or more inlets spaced along said reactor and quench liquid into a plurality of inlets spaced along the top of said reactor so that said at least one catalyst component and said quench liquid are intimately mixed with said bed of polymer;
   c. removing without substantial pressure letdown polymer from said polymer bed to a post-polymerization zone into which a controlled amount of said monomer is introduced and wherein a controlled amount of essentially adiabatic polymerization takes place and said polymer is melted to form easily transferable molten polymer;
   d. removing off-gases from said reactor through one or more reactor off-gas outlets spaced along the top of said reactor and removing entrained polymer therefrom and condensing quench liquid from said off-gases in a separation zone to form a liquid recycle and a gaseous recycle;
   e. returning said gaseous recycle to said one or more vapor recycle inlets;
   f. taking off a first portion of said liquid recycle containing any entrained polymer remaining in said off-gases and introducing said first portion through said plurality of inlets into said reactor;
   g. taking off a second smaller portion of said liquid recycle and using said second portion for make-up of at least one catalyst component;
   h. introducing make-up of said quench liquid into said reactor;
   i. decomposing the catalyst components contained in the molten polymer of (c) with a kill substance;
   j. treating the product of (i) to remove volatile components therefrom; and
   k. cooling the polymer product of (j) to ambient temperature.

2. The process of claim 1 wherein said at least one monomer is at least ethylene.

3. The process of claim 2 wherein said at least one catalyst component are a trialkylaluminum cocatalyst and a supported titanium compound catalyst.

4. The process of claim 2 wherein said at least one catalyst component are a supported chromium compound catalyst and an alkylaluminum or alkylboron compound cocatalyst.

5. The process of claim 2 wherein said at least one catalyst component are a supported chromium compound catalyst.

6. The process of claim 2 where said quench liquid is isobutane or isopentane.

7. The process of claim 3 where said quench liquid is isobutane or isopentane.

8. The process of claim 4 where said quench liquid is isobutane or isopentane.

9. The process of claim 5 wherein said quench liquid is isobutane or isopentane.

10. The process of claim 6 wherein said kill substrate is water.

11. The process of claim 7 wherein said kill substance is water.

12. The process of claim 8 wherein said kill substance is water.

13. The process of claim 9 wherein said kill substance is water.

14. The process of claim 1 wherein said at least one monomer is propene.

15. The process of claim 14 wherein said at least one catalyst component are a dialkylaluminum chloride and an activated titanium trichloride.

16. The process of claim 14 wherein said quench liquid is isobutane, isopentane, propene, a mixture of propene and isobutane or a mixture of propene and isopentane.

17. The process of claim 16 wherein said kill substance is water.

18. The process of claim 2 in which said reactor contains two or more of said polymerization sections and at least one of said sections is operated at a different polymerization temperature than the remaining said sections.

19. The process of claim 14 in which said reactor contains two or more of said polymerization sections and at least one of said sections is operated at a different polymerization temperature than the remaining said sections.

20. The process of claim 2 wherein said reactor is separated into at least two compartments, each of which is separately controllable in respect to partial pressures of the vapor components, said compartments being interconnected so that polymer contained in said bed of polymer is free to move between compartments but the flow of said vapor components between compartments is controlled and wherein each of said compartments has an individual said separation zone and said gaseous recycle.

21. The process of claim 14 wherein said reactor is separated into at least two compartments, each of which is separately controllable in respect to partial pressures of the vapor components, said compartments being interconnected so that polymer contained in said bed of polymer is free to move between compartments but the flow of said vapor components between compartments is controlled and wherein each of said compartments has an individual said separation zone and said gaseous recycle.

22. The process of claim 2 wherein said reactor has two or more of said polymerization sections and wherein said at least one catalyst component is added to at least one of said sections at a concentration different than said at least one catalyst component being added to the remaining said sections.

23. The process of claim 14 wherein said reactor has two or more of said polymerization sections and wherein said at least one catalyst component is added to at least one of said sections at a concentration different than said at least one catalyst component being added to the remaining said sections.

24. The process of claim 15 wherein said quench liquid is isobutane, isopentane, propene, or a mixture of propene and isobutane or a mixture of propene and isopentane.

25. The process of claim 24 wherein said kill substance is water.

26. The process of claim 1 in which said reactor contains two or more of said polymerization sections and at least one of said sections is operated at a different polymerization temperature than the remaining said sections.

27. The process of claim 26 wherein said reactor is separated into at least two compartments, each of which is separably controllable in respect to partial pressures of the vapor components, said compartments being interconnected so that polymer contained in said bed of polymer is free to move between compartments but the flow of said vapor components between compartments is controlled and wherein each of said compartments has an individual said separation zone and said gaseous recycle.

* * * * *

UNITED STATES PATENT OFFICE
CERTIFICATE OF CORRECTION

Patent No. 3,965,083  Dated June 22, 1976

Inventor(s) James L. Jezl, Edwin F. Peters, Robert D. Hall, John W. Shepard

It is certified that error appears in the above-identified patent and that said Letters Patent are hereby corrected as shown below:

Column 4, line 5  "parts" should be -- part
" 8, " 14  "gses" should be -- gases
" 8, " 37  Insert a left parenthesis between the words "impellors" and "eight"
" 9, " 51  "its opening 41," should be -- its opening 418,
" 12, " 5  "% at 2 in/minl" should be -- % at 2 in/min
also, this line should be indented only 2 spaces in
" 14, " 65  "substrate" should be -- substance
" 16, " 20  "propene, or a" should be -- propene, a Signed and Sealed this Seventh Day of September 1976

[SEAL]

Attest:

RUTH C. MASON
Attesting Officer

C. MARSHALL DANN
Commissioner of Patents and Trademarks